United States Patent [19]
Fernandez-Baujin

[11] 4,094,936
[45] June 13, 1978

[54] PACKED BED GAS-LIQUID CONTACTOR

[75] Inventor: Jorge M. Fernandez-Baujin, North Bergen, N.J.

[73] Assignee: The Lummus Company, Bloomfield, N.J.

[21] Appl. No.: 768,958

[22] Filed: Feb. 16, 1977

[51] Int. Cl.² .................. B01D 47/14; B01D 53/20
[52] U.S. Cl. .................. 261/96; 210/150; 261/97; 261/DIG. 72
[58] Field of Search .......... 261/97, 96, 102, 105, 261/DIG. 72; 210/150, 151

[56] References Cited

U.S. PATENT DOCUMENTS

| | | | |
|---|---|---|---|
| 598,351 | 2/1898 | Staub | 261/DIG. 72 |
| 2,271,671 | 2/1942 | Wible | 261/94 |
| 3,208,833 | 9/1965 | Carson | 261/DIG. 72 |
| 3,214,247 | 10/1965 | Broughton | 261/96 |
| 3,285,587 | 11/1966 | Huber | 261/96 |
| 3,996,316 | 12/1976 | Friedman et al. | 261/97 |

Primary Examiner—Frank W. Lutter
Assistant Examiner—Gregory N. Clements
Attorney, Agent, or Firm—Marn & Jangarathis

[57] ABSTRACT

A packed bed gas-liquid contactor wherein the liquid distributor is positioned within and supported by the packed bed, with the portion of the packed bed above the liquid distributor being blocked by an imperforate structure and the remaining portion including non-process packing, whereby gas flows from the process packing through a limited portion of the upper part of the packed bed, defined by the non-process packing to the gas outlet. In this manner, the residence time of the gas in the upper portion of the bed is limited.

6 Claims, 3 Drawing Figures

PACKED BED GAS-LIQUID CONTACTOR

This invention relates to packed beds, and more particularly, to a new and improved gas-liquid contacting apparatus including a packed bed.

Packed bed gas-liquid contactors may be used in a wide variety of processes. Thus, for example, there has been proposed a process for producing chlorinated hydrocarbons by countercurrently contacting a hydrocarbon, hydrogen chloride and/or chlorine with a molten copper chloride salt, and such a process may be conveniently effected in a gas-liquid contact reactor, including a packed bed. In effecting such a process, there is a need for improvements in such gas-liquid contactors wherein the contacting is effected in a packed bed.

An object of the present invention is to provide an improved gas-liquid contacting apparatus.

Another object of this invention is to provide an improved gas-liquid contact reactor for the production of chlorinated hydrocarbons.

These and other objects of the present invention should be more readily apparent from reading the following detailed description thereof.

In accordance with the present invention, there is provided a gas-liquid contacting apparatus which is comprised of a packed bed with the liquid distributing means being positioned within and supported by the packed bed. The packed bed is comprised of a lower portion; i.e., below the liquid distributors of process packing and an upper portion; i.e., above the liquid distributors which includes both non-process packing and an imperforate structure, with the imperforate structure blocking a portion of the upper portion of the packed bed, whereby the gas flow cross sectional area, defined by the non-process packing, in the upper portion of the packed bed, is less than the gas flow cross sectional area in the lower portion of the bed, defined by the process packing. In this manner, the gas residence time in the upper portion of the packed bed; i.e., the space above the liquid distributors, can be reduced.

The non-process packing is the portion of the packing which is above the liquid distributor, and therefore is not wetted by the liquid.

More particularly, there is provided a plurality of liquid distributors which are dispersed within and supported by the packed bed, with one of the distributors being a main distributor and preferably being centrally located within the packed bed. The remaining distributors are distributed throughout the bed on a horizontal plane below the main distributor, and the main distributor is interconnected with each of the remaining distributors, whereby liquid feed can be introduced into the main distributor, and distributed therefrom both directly into the bed and into each of the branch distributors. Liquid feed introduced into the branch distributors is then distributed into the packed bed below such distributors. The distributors employed for separately introducing the liquid into the packed bed may be any one of those typically employed in the art, including perforated distributors and weir boxes. By placing a plurality of distributors below the plane of the main distributor, the liquid feed can flow, by gravity, from the main distributor into the remaining distributors.

The upper portion of the packed bed; i.e., the portion above the liquid distributors is comprised of non-process packing and an imperforate structure, as hereinabove described. The imperforate structure preferably has a cross sectional area which is essentially equal to the cross sectional area of the liquid distributors and extends upwardly from the liquid distributors to the top of the bed thereby defining a plurality of imperforate columns above each of the liquid distributors. The non-process packing defines a gas flow channel which extends upwardly above the liquid distributors in the space between the imperforate columns to the top of the packed bed. In this manner, only a limited portion of the overall vessel cross section is employed for passing the gas from the process packing to the gas outlet, thereby reducing the gas residence time in the upper portion of the packed bed.

The invention will be further described with respect to an embodiment thereof illustrated in the accompanying drawings, wherein.

Figure 1:
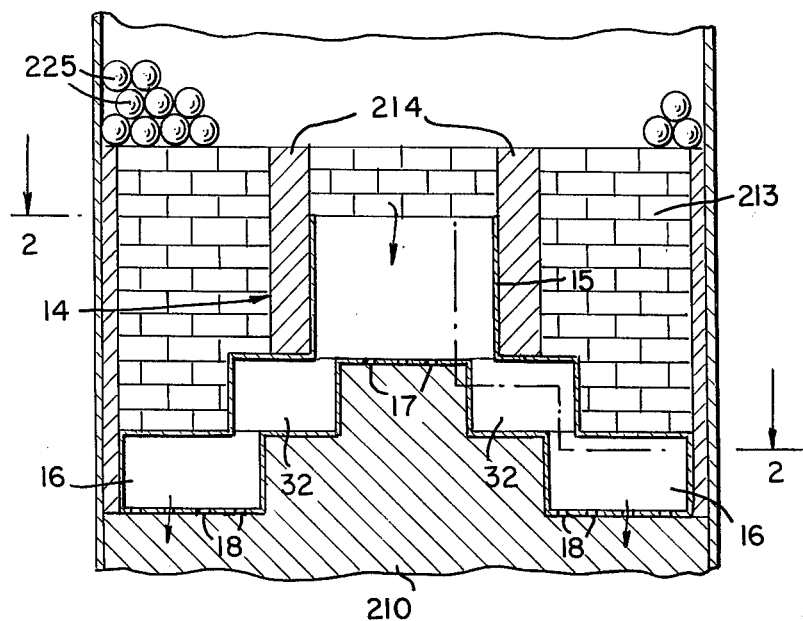
FIG. 1 is a cross sectional view of the upper portion of an embodiment of the gas-liquid contactor.
Figure 2:
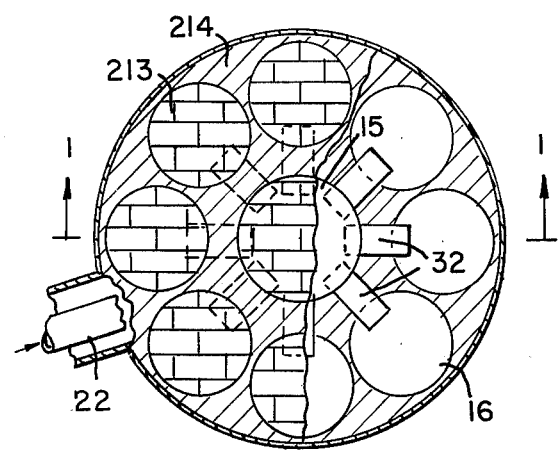
FIG. 2 is a top section view taken along line 2—2 of FIG. 1.
Figure 3:
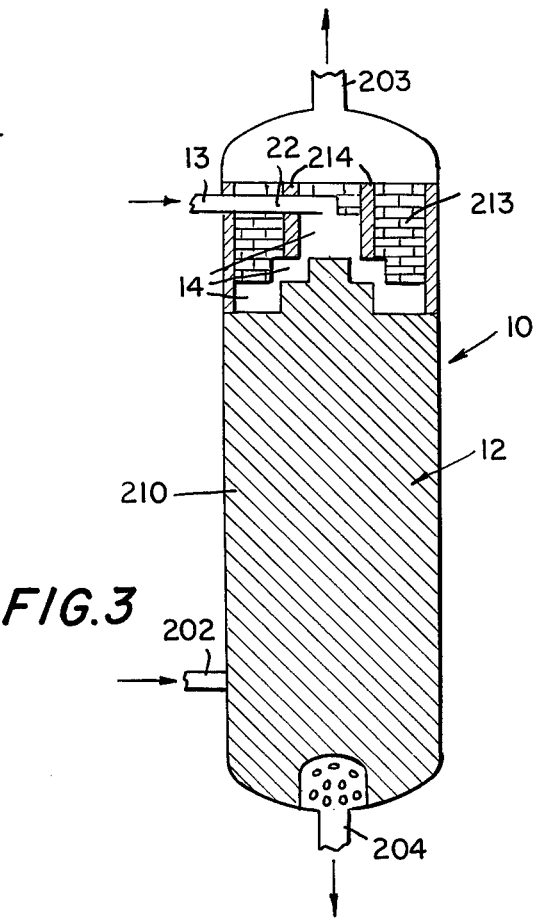
FIG. 3 is a simplified sectional view of the gas-liquid contactor.

Referring now to the drawings, there is shown a gas-liquid contacting apparatus, in the form of a reaction vessel 10, including a packed bed, generally indicated as 12. The upper portion of the vessel 10 is provided with a liquid feed inlet 13 for introduction of a molten salt and a gas outlet 203 for withdrawing the gaseous chlorinated hydrocarbon effluent. The lower portion of the reactor 10 is provided with a gas inlet 202 for introducing gaseous reactants into the packed bed 12 and a liquid outlet 204 for withdrawal of molten salt from the packed bed.

The liquid distributing apparatus generally indicated as 14, is comprised, in its major parts, of a main distributor box 15, positioned in the packing in a plane below the plane on which the liquid feed inlet 13 is located; and a plurality of branch distributor boxes 16, positioned on a plane below the plane of the main distributor box 15. As particularly shown, the main distributor box 15 is centrally positioned in the vessel 10 and the plurality of branch distributor boxes 16 are circularly arranged about the main distributor box 15, but it isto be understood that other arrangements may also be employed. The main distributor box 15 and the plurality of branch distributor boxes 16 are positioned within and are supported by the packing and, accordingly, there is no need for separate and independent support structure for the boxes 15 and 16. The main distributor box 15, and each of the branch distributing boxes 16, are provided with means for distributing liquid from the boxes into the bed. As particularly shown, such means is in the form of a plurality of perforations or orifices 17 in the bottom of box 15, and a plurality of perforations or orifices 18 in the bottom of boxes 16, but it is to be understood that other means, such as, notched weirs, etc. may be employed instead of perforations. The upper portion of main box 15 is preferably provided with a notched weir (not shown) to accomodate for overflow or liquid surge, and the branch distributor boxes 16 are also preferably provided with notched weirs (not shown) for the same purpose.

A plurality of branch spillways 32 (one for each branch distributor box 16) are positioned within and supported by the packing 12 between each branch distributor box 16 and the main distributor box 15, for receiving liquid from the main distributor box and transporting same to the branch distributor boxes. The branch spillways 32 are supported on a packing level below the packing level which supports the main distributor box 15, and above the packing level which supports the branch distributor boxes 16. It is to be understood that the branch spillways 32 may also include notches, weirs, or the like for effecting liquid distribution therefrom.

The lower portion of the packed bed; i.e., below the liquid distributors is comprised of process packing, generally designated as 210. The upper portion of the packed bed; i.e., above the liquid distributors is comprised of an imperforate structure, generally designated as 213 and non-process packing, generally designated as 214. The imperforate structure 213, in the form of a brick structure, or any other similar structure, occupies the cross sectional area immediately above each of the branch distributors 16 and the main distributor 15 to block the portion of the upper cross sectional area of the packed bed which is immediately above the liquid distributors to thereby prevent any gas flow in such portion of the reaction vessel 10. Accordingly, the imperforate brick structure 213 defines a plurality of columns having a cross sectional area equal to the cross sectional area of its corresponding branch distributor or main distributor which extends upwardly from the distributor to the top of the bed. The remaining portion of the upper portion of the packed bed is comprised of the non-process packing 214 whereby upwardly flowing gas passes from the process packing through the non-process packing to the gas outlet 203. In this manner, only a limited portion of the upper portion of the packed bed is available for gas flow, with such portion being defined by the non-process packing 214 which provides gas channels for passing gas from the process packing to the gas outlet 203. A top layer of balls 225 is provided for the purpose of holding down the packing.

In operation, a gas to be chlorinated, such as methane, ethane, ethylene and the like and a chlorinating agent which is either hydrogen chloride and/or chlorine is introduced into the reactor 10 through the gas inlet 202, and a gas distributor (not shown). A molten salt containing copper chlorides and copper oxychloride, as well as a melting point depressant, such as potassium chloride, is introduced into the reactor 10 through inlet 13. The molten salt flows through the main spillway 22 to the main distributor box 15 from which the molten salt is distributed through orifices 17 to the packed bed and to the branch spillways 32. The liquid introduced into branch spillways 32 is passed to the branch distributor boxes 16 and distributed, through orifices 18 to the packed bed. The molten salt flows through the process packing and is countercurrently contacted by the gas feed introduced through line 202 to effect chlorination/oxychlorination of the feed to produce a gaseous effluent containing chlorinated hydrocarbons. The molten salt is withdrawn from the bottom of the reactor 10 through liquid outlet 204. The upwardly flowing gas flows from the process packing through the non-process packing and is withdrawn from the reactor 10 through gas outlet 203.

As a result of the use of the imperforate structure in the portion of the reactor above the liquid distributors, the residence time of the gases leaving the process packing is reduced. It has been found that such a reduction in the residence time in the packing above the liquid distributors results in reduced carbon dimer and carbon dioxide formation. In general, the respective portions of the non-process packing and imperforate structure are selected to provide a gas residence time in the upper portion of the packed bed of no more than 2 seconds.

Although the invention has been particularly described with respect to the preferred embodiment for the production of chlorinated hydrocarbons, it is to be understood that the invention is not to be limited to such an embodiment in that the gas-liquid contactor could be employed for purposes other than the production of chlorinated hydrocarbons.

Numerous modifications and variations of the present invention are possible in light of the above teachings and, therefore, within the scope of the appended claims, the invention may be practiced otherwise than as particularly described.

What is claimed is:

1. A gas-liquid contactor apparatus, comprising:
a vessel;
a gas inlet in the lower portion of the vessel;
a gas outlet in the upper portion of the vessel;
a liquid inlet in the upper portion of the vessel;
a liquid outlet in the lower portion of the vessel;
a packed bed within said vessel;
a plurality of liquid distributors for distributing liquid into the packed bed, said plurality of liquid distributors being supported within and solely by said packed bed, said liquid inlet introducing the liquid into the liquid distributors, said packed bed including a lower portion below the liquid distributors and an upper portion above the liquid distributors, said lower portion of the packed bed being comprised of process packing, said upper portion of the packed bed being comprised of an imperforate structure and non-process packing, said imperforate structure blocking a portion of the upper portion of the packed bed and being comprised of a plurality of separate imperforate columns which extend from liquid distributors upwardly to the top of the packed bed, the remaining portion of said upper portion of the packed bed being comprised of said non-process packing whereby gas flows through a limited portion of the upper portion of the packed bed defined by the non-process packing to reduce the gas residence time in the upper portion of the bed.

2. The contactor of claim 1 wherein the imperforate columns extend above each liquid distributor and have a cross sectional area corresponding to the cross sectional area of the liquid distributor.

3. The contactor of claim 2 wherein the imperforate structure and non-process packing are selected to provide a gas residence time in the upper portion of the bed of no more than 2 seconds.

4. The contactor of claim 1 wherein said plurality of said liquid distributors are positioned on two different planes on said packed bed and the imperforate columns extend above each liquid distributor and have a cross-sectional area corresponding to the cross-sectional area of the liquid distributor.

5. The contactor of claim 1 wherein said plurality of distributors are comprised of a main distributor and auxillary liquid distributors positioned below the main liquid distributor, said imperforate columns extending above the main liquid distributor and each of the auxillary liquid distributors and having a cross-sectional area corresponding to the cross-sectional area of the main and auxillary liquid distributors.

6. The contactor of claim 1 wherein said separate imperforate columns are formed of brick.

* * * * *